Dec. 29, 1964 P. E. STRATMAN 3,163,178
COUPLER FOR HYDRAULIC LINES
Filed Nov. 19, 1962
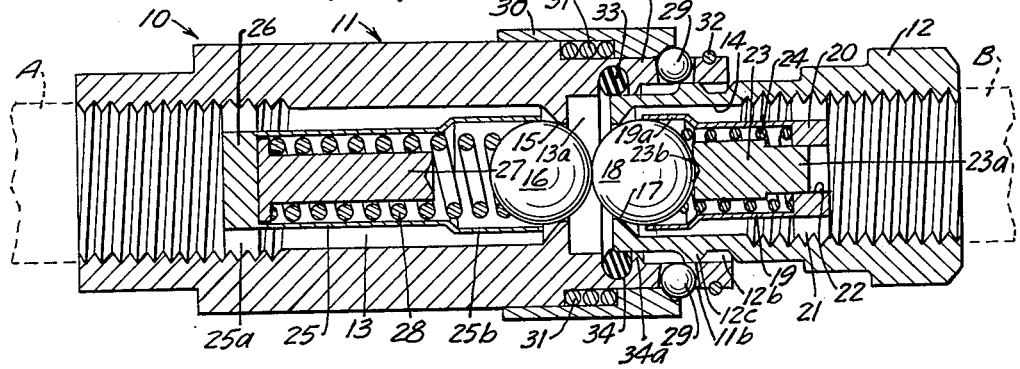
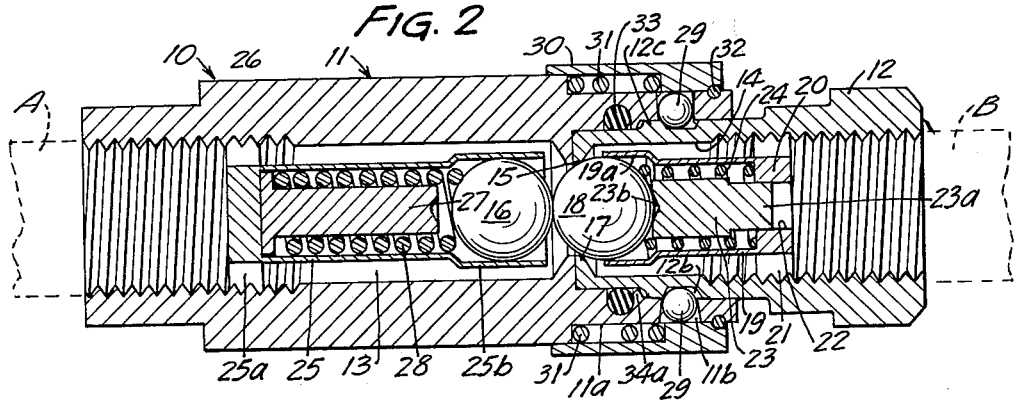
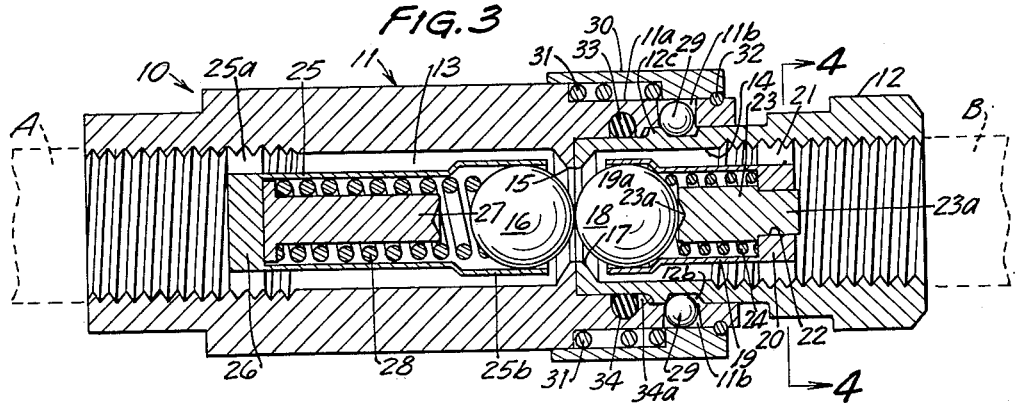
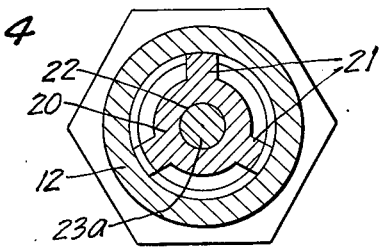
INVENTOR
PAUL E. STRATMAN
BY Williamson & Palmatier
ATTORNEYS 3,163,178
COUPLER FOR HYDRAULIC LINES
Paul E. Stratman, Minneapolis, Minn., assignor to Pioneer Hydraulics, Inc., Minneapolis, Minn., a corporation of Minnesota
Filed Nov. 19, 1962, Ser. No. 238,548
8 Claims. (Cl. 137—614)

This invention relates to a coupling device for coupling and uncoupling two conduit sections carrying fluid under pressure without leakage of fluid from either section, and particularly to a coupling device wherein the check valves thereof may be effectively and quickly closed without damage thereto even when subjected to substantially high pressures.

Many of the conventional coupling devices now available for use in interconnecting conduit sections carrying fluid under pressure, are comprised of tubular body members, of the male and female type, which are usually interfitted and locked together in communicating relation. These body members are usually provided with check valves, most of which are of the ball type, which are urged into closed relation by resilient means. The resilient means in most conventional coupling devices are usually positioned within the bores of the body members and bear against the rear surface of the check ball valves. Thus when the body members are uncoupled, the check ball valves are not only urged to their respective valve seats by the resilient means but quite often are subjected to high fluid pressure. When these check valves are subjected to high fluid pressures, the valves are urged to their respective valve seats with such high pressure that damage to the valve seats quite often results.

It is therefore a principal object of my invention to provide a simple and highly efficient coupling device for effectively but releasably interconnecting two fluid conduit sections in communicating relation, each tubular body of the coupling device having check valves normally urged to the seated closed relation by resilient means when the device is uncoupled, and shielding means to shield each check valve from the effects of fluid pressure and thereby allow the check valves to be moved at a low velocity to its seated relationship almost entirely by action of the resilient means thereby preventing damage to the valve seats.

Another object of this invention is the provision of a coupling device of the class described wherein the shielding means for one of the check valves is provided with a stop and plunger mechanism effective when the body members are coupled to limit the retraction of its associated check valve to a position when both valves in abutment are equally spaced from their respective seats, and being operable during uncoupling of the body members to be moved forwardly in response to fluid pressure to assist its associated resilient means in urging the associated check valve to its seated position at a velocity sufficiently low enough to prevent damage to the valve but adequate to minimize the escape of fluid from the tubular body member.

Another object of this invention is to provide a coupling device of the class described and including an improved seal comprising an annular compressible member effective during the coupling operation to minimize the loss of fluid and being positioned within an annular groove, the latter being shaped and contoured to prevent extrusion and excessive wear of the annular element when exposed to fluid under pressure during the uncoupling operation.

These and other objects and advantages of my invention will more fully appear from the following description made in connection with the accompanying drawings wherein like character references refer to the same or similar parts throughout the several views, and in which:

FIG. 1 is a longitudinal central sectional view through a coupler embodying my invention, showing the general parts of the coupler with corresponding ends, partially telescoped just prior to coupling with the bores of both parts valve-sealed;

FIG. 2 is a similar sectional view showing the main tubular body parts completely coupled and fully telescoped in sealed relation and showing the check valve or ball of one of the tubular body members dislodged and opened occupying a position beyond its normal operating position when the lines are in communication, which has been accomplished by abutment and dislodgment of said valve member by the contact with the valve element of the second body member which is held against this valve seat because of being subjected to relatively higher and greater pressure than said first mentioned valve elements;

FIG. 3 is a generally similar sectional view with some portions of the two main members shown in full wherein pressure has been equalized in the two lines and the valve elements and related parts are positioned in the normal operating position with the valve element centered and being precisely equally spaced from their respective seats; and FIG. 4 is a cross-sectional view taken approximately along line 4—4 of FIG. 1 and looking in the direction of the arrows.

Referring now to the drawings it will be seen that one embodiment of my novel coupling device, designated generally by the reference numeral 10, is there shown. This hydraulic coupling device 10 includes a pair of tubular, telescopically interfitting body members designated generally as 11 and 12 and having axial bores 13 and 14 therethrough. The body member 11 which may be referred to as a socket or female member and which as illustrated is adapted to be connected with a conduit or line from the hydraulic pump or source of hydraulic fluid under pressure through a suitable threaded fitting A, has its bore diametrically enlarged for a short portion of its length 13a adjacent the inner extremity thereof to telescopically accommodate the reduced extremity of the second body member 12 which may be referred to as the tip or male body member, connected by suitable threaded fitting B with the line of the actuated implement. To this end it is pointed out that my hydraulic coupler is especially adapted for use in connecting the fluid pressure line extending from a tractor to a fluid pressure motor while operating an implement. The bore 13 and socket member 11 is diametrically and uniformly reduced, just ahead of the tip-receiving enlargement 13a to form a dished ball seat 15 in which a valve element, shown as a metal ball 16, is adapted to be very nicely seated.

Correspondingly formed just rearward of the extremity of the male or tip body member 12, the bore 14 is reduced to form a similar dished valve seat 17 adapted to receive the ball or spheroid valve element 18. The balls 16 and 18 are of such a diameter that when seated in their respective seats 15 and 17, they will each protrude peripherally from the opening of said seats to cause engagement and thrust from one ball member to another when the two body parts 11 and 12 are thrust together for coupling from the position shown in FIG. 1 to the position shown in FIG. 2.

A stationary valve shield and guiding member or sleeve 19 is generally cylindrical in configuration and is axially disposed with respect to the bore 14 of the male body member 12. This valve shield and guiding sleeve 19 has its front end portion diametrically enlarged as at 19a and which is of a size to receive a ball 18 therein. It will also be noted that the valve shield and guiding member 19 is provided with a closed rear wall 20 having a spiderhead 21 integrally formed therewith, the latter being provided with threads for engagement with the internal threads of the male body member 12. With this arrangement, the sleeve 19 may be longitudinally adjusted with respect to the male body member 12.

The rear closed end 20 of the sleeve 19 is provided with a centrally located axially extending aperture 22 therethrough and this aperture receives in snug fitting relation therein the reduced end portion 23a of a stop and plunger element 23. This plunger 23 is axially movable with respect to the sleeve 19 and is limited in forward thrust by engagement with the ball 18 when the latter is in seated relation with respect to the valve seat 17. The reduced portion 23a of the plunger and stop element 23 defines a shoulder which engages the rear wall 20 of the sleeve 19 so that rearward movement of the plunger is limited. When in this rearmost position, the plunger and stop element 19 serves to limit rearward movement or retraction of the ball 18.

A coil compression spring 24 surrounds the stop element 23 and is interposed between the inner surface of the rear end 20 of the sleeve 19 and the opposing periphery of the ball 18. This coil spring 24 has a predetermined tension and pressure-applying force through its strength size of its coiled tempered wire or through overall length and number of convolutions employed and normally urges the ball valve element 18 against its seat 17. It is also pointed out that the plunger 23 is subjected to fluid pressure and assists the spring 24 during the uncoupling operation to urge the ball valve element 18 at a relatively low velocity against its seat 17. The reduced end portion 20b engages in rather snug fitting relation within the aperture 22 so that little, if any, hydraulic fluid will enter the sleeve at this aperture. Thus it will be seen that the ball 18 being disposed within the imperforate shielding and guilding sleeve 19 will be acted upon solely by the spring 24 and thrust action exerted by the plunger 23 and will not be subjected to the direct effects of the fluid pressure flowing through the lines.

Therefore since the ball valve element 18 is not subjected to extremely high fluid pressures during the uncoupling operation, the ball can be very effectively seated against the valve seat 17 at a low velocity to thereby preclude damage to the ball element and valve seat. The valve seats will not be damaged by a thrust exerted by the ball valve elements and it has been found that the seats will actually be improved by this closing action since the light and constant peening action is produced which continually shapes and contours the seat to the shape of the ball valve elements.

An elongate shield and guiding member or sleeve 25 is integrally formed with a spider leg 25a, and is axially disposed of the bore 13 of the female body member 11 and has a diametrically enlarged front terminal portion 25b formed on a raise preferably slightly larger than the radius of the cooperating ball valve member 16 for receiving the same therein. The external threads on the ends of the spider legs 25a engage the internal threads of the female body member 11 to permit longitudinal adjustment of this sleeve member 25. It will be noted that this sleeve member 25 is of a length greater than the length of the sleeve member 19. The sleeve member 25 is provided with a closed rear end wall 26 and also has a stop member 27 positioned therein for axial movement relative thereto. It is pointed out that the ball stop member 27 serves primarily as a spacer to permit initial setting and adjustment of the ball 16 during manufacture. An elongate compression coil spring 28 of substantially greater strength than the spring 24 surrounds the stop element 27 and is interposed between the inner surface of the end wall 26 and the opposing periphery of the ball 16. It is very important that the ratio of strengths of these two springs be of such proportions as to hold the ball valve elements in the open position as illustrated in FIG. 3 when the respective body members are in complete coupled relation. It has been found that a ratio of two to one is normally sufficient. It is therefore preferred that the tension force exerted by the spring 28 be substantially twice that exerted by the spring 24.

It will be noted that the enlarged portion 25b of the valve shield and guiding sleeve 25 is of a size to allow the valve ball element 16 to retract a distance greater than the normal position of location when the respective body members are in the completely coupled position as illustrated in FIG. 3. It is desirable that the enlarged portion 25b be of a size to permit the valve ball element 16 to retract a distance at least twice its normal distance of retraction as illustrated in FIG. 2. By permitting this amount of retraction of the ball 16 complete recoupling under pressure may be accomplished manually as will be pointed out more fully hereinbelow.

Means are also provided for releasably holding the coupled parts in their coupled relation and this means is associated with the end portion of the male body member 12 and the cooperating socket portion or the female body member 11. The male or tip member 12, a short distance rearwardly from its extremity, is provided with a shallow annular groove 12b, having outwardly sloping sides, and this groove will register with a plurality of radial apertures 11b circumferentially spaced and disposed in the forward telescoping portion of the socket or female body member 11. Apertures 11b loosely accommodate an equal number of small detent balls 29 which at all times are at least partially and slidably overridden by a retaining collar 30 which is slidably mounted on the forward reduced end 11a of the female or socket body member 11. Collar 30 is chambered out to slide over the larger diameter of the female body member 11 and to also accommodate a coil spring 31 which urges the collar to the right as viewed in the drawing, with the outer extremity of the collar always at least partially overlying and retaining the detent balls 29 in place. In FIG. 1, collar 30 has been manually urged to the left to permit the detent balls 29 to be displaced downwardly and radially for accommodation of the male body member 12 at its outer end within the socket portion of the female body member 11. Outward movement of the collar 30 is limited to the position shown in full coupled relation of the parts in FIG. 2 by a snap ring 32 seated in external groove on the reduced outer portion of the female socket body member 11. Just forwardly of the annular retaining groove 12b for interlocking with the detent ball elements 29 is a wide annular edge 12c which engages the detent balls 29 just prior to locking of the two body members 11 and 12, as clearly shown in FIGS. 1 and 2.

With the spring actuated locking collar 30 annularly retracted as shown in FIG. 1, with the ball valves 16 and 18 abutted as shown therein (assuming no source-pressure is imposed on the bore body member 11), the tip 12 may be easily fully telescoped to its limit of movement within the socket 11, the final inward telescoping movement causing the pressure trapped ball valve 18 to dislodge ball 16 from its seat and move it to its extreme retracted position slightly beyond the open operating position as shown in FIG. 2. In the final coupling, locked collar 30 moves forwardly due to the tension upon spring 31, thereby fully locking the device as shown in FIGS. 2 and 3, and retaining the several detent balls 29 in the annular locking groove 12b.

When the lines are coupled as shown in FIGS. 2 and 3, fluid escape is positively prevented by means of an O-ring 33 which is disposed in an internal groove 34 in the enlarged outer portion 13a of the bore which engages the peripheral reduced portion of the male or tip body member. The construction of this O-ring seal is different than the O-ring seal construction disclosed in co-pending application, Serial No. 151,303. Referring again to FIG. 1 it will be seen that the annular groove 34 is formed in the enlarged outer portion 13a whereby the U-shaped groove in cross section is of substantially perfect U-shaped configuration and defines a front shoulder 34a adjacent the outermost end. With this arrangement, the O-ring 33 will engage the exterior surface of the male body member 12 during the uncoupling operation to very effectively form a seal thereat to minimize the loss of fluid during the uncoupling operation. Furthermore the shoulder 34a prevents the extrusion of the O-ring 33 in an outward direction when the O-ring is subjected to hydraulic pressure during the uncoupling operation and thereby prevents the excessive wear of this O-ring.

*Operation*

In the coupling of the novel coupling device 10 previously described, it is assumed that no pressure fluid is being communicated to the bore 13 of the socket or female body member 11 from a pump or other source of fluid under pressure. FIGS. 1 to 3 inclusive illustrate the coupling structure and mechanism in the three principal stops of operation where the tip or male coupling member 12 is subjected to a substantially trapped pressure from the conduit section or line directly connected with an implement or other device adapted to be fluid-actuated.

In such conditions the check ball 18 through excessive pressure is retained firmly against the seat 17 in the male or tip body member 12. The ball 16 before the body members 11 and 12 are fully telescoped inwardly is held in its closed position against its seat 15 by the relatively strong coil spring 28. The body members are initially interfitted in by hand, the locking collar 30 is retracted against tension of its spring 31 to the position illustrated in FIG. 1, then permitting the terminal portion of the male or tip body member 12 to be disposed in the position of FIG. 1 where the detent balls 29 of the collar 30 override the ledge 12c. As such time the ball valve elements 16 and 18 just abut.

Thereafter the two body members 11 and 12 may be finally telescoped with little manual effort, causing in the last relative inward longitudinal movement of the two body members the pressure trapped ball 18 to dislodge and retract the ball 16 rearwardly from its seat to its full extent of retraction, i.e., to the extreme position shown in FIG. 2. Simultaneously the released collar 30 urged by its spring 31 slides forwardly and the detent balls 29 overridden by the collar seat in the annular locking groove 12b, the body members 11 and 12 being then releasably interlocked with the O-ring 33 engaging the exterior circumferential surface of the male body member 12 to positively seal the coupling parts from leakage.

As clearly shown in the drawings the distance of maximum axial retractive movement of the ball valve element 16 from its fully seated position as shown in FIG. 1 to the retracted position shown in FIG. 2 may be in excess of twice the distance of retraction of the frozen valve element 18. Thus the inward telescoping of the imposed end portions of the male body member 12 and the female body member 11 has to provide for and accommodate such displacement movement.

It will be noted that both of the ball valve elements 16 and 18 are axially centered and guided in all retractive and protrusive movements. In the case of the check ball valve element 16, the valve shield and guiding sleeve 25 along with the coil spring 28 engage and guide the ball at all times in centered precise relation. Similarly the ball valve element 18 is guided by the valve shield and guiding sleeve 19 and the weaker coil spring 24. Therefore it will be seen that the ball valve element 18 is axially centered at all times in its retracted movement from its seat 17 to its stop position against the concave surface 23b of the stop and plunger element 23.

The differential compression strengths of the springs 24 and 28 allow the spring 28 in the female body member 11 which is connected to the pump of a tractor or the like to overbalance the strength of the spring 24 in the bore of the male body section which is connected to the implement so as to maintain the check ball valve element 18 against its stop 23 and to prevent chattering or displacement of both balls from the equidistanced spaced position from their seats shown in FIG. 3 which is essential for operation. In the freeing of the check ball valve element 18 from the seated pressure-trapped condition when the pressure from the pump plus the differential pressure from the strengths of the two springs 28 and 24 is slightly greater than the trapped pressure of the implement line, ball 18 begins to retract and pressures are equalized on both sides of both valves.

In the improved structure as described, both of the check ball valve elements 16 and 18 are not only axially centered and guided in all retractive and protrusive movement but both of these ball elements are shielded from extreme fluid pressure by the imperforate shield members 19 and 25 respectively. With this arrangement, the ball element 16 is moved entirely from its retracted position, as illustrated in FIG. 3, to its seated position as illustrated in FIG. 1 by action of the spring tension. Movement of this ball element 16 because of said shielding member 25 is at a very low velocity so that damage to the valve element and to its cooperating seat 15 is precluded. Furthermore as pointed out above, by seating the ball solely by the spring action 28, a light and constant peening action occurs which continuously forms and contours the seat 15 to the contour of its associated check ball valve element 16.

With regard to the ball element 18, this element is moved from its retracted position to its seated position not only by action of the weaker spring 24 but also by action of the plunger element 23, the latter being subjected to action of fluid pressure during the uncoupling operation. It will be seen that the fluid pressure exerted on the rear surface of the reduced portion 23a of the plunger and stop element 23 will cause the plunger to move forwardly during the uncoupling action whereby the plunger and stop element functions as a piston. This plunger action of the plunger and stop element 23 assists the spring and return of the ball valve element 18 to its seated position at a velocity sufficiently high as to minimize the loss of fluid therefrom during the uncoupling operation but sufficiently low to prevent damage to the ball valve element and its associated seat. A light constant peening action also occurs between the valve element 18 and its associated valve seat 17 so that the valve seat is constantly shaped and contoured to receive the check ball element 18 in contoured snug fitting relation. Thus both ball elements 16 and 18 are completely shielded from the high fluid pressures whereby a very substantial increase in the life of the coupling device is achieved.

It is first pointed out that my novel coupling device is especially adaptable for use in coupling tractor hydraulic line with a hydraulic line for a hydraulically operated implement. One advantage of this type of coupling is the ease of uncoupling when the implement such as a plow or the like strikes an embedded object thereby preventing damage to the hydraulic system.

It is also pointed out that during the uncoupling operation, the large heavy spring 28 serves to very quickly move the ball valve element at a low velocity to the seated position. However, during the initial movement of the body members 11 and 12 during the uncoupling operation, it is also necessary to cause the body valve element 18 to also be moved towards its seated relation. While the coil spring 24 serves in part to urge this ball valve element 18 to the seated position, the plunger 23 speeds up the return of the ball valve element in the return direction. This prevents escape of hydraulic fluid into the volumetric space 13a which would occur if the ball valve element 18 were moved to the seated position at a relatively slow speed. The oil accumulating in this area would tend to increase the uncoupling effect but with the undesirable results of a loss of hydraulic fluid.

It will therefore be seen that the unique cooperative relation of the plunger 23 and the coil spring 24 not only permit return of the ball valve element at a velocity to prevent damage to the seat 17 but also at a velocity to prevent the loss of oil or hydraulic fluid during the uncoupling operation.

During colder weather, the hydraulic fluid increases in viscosity especially at temperatures at 20° F. or below. In many conventional coupling devices, the check ball valve element associated with the body member connected to the source or pump will be forced from its open position by the return of the thick cold hydraulic fluid and will compress the spring associated therewith thereby interfering with the normal open relation of the valve elements. However, by shielding the ball valve elements 16 and 18, these ball valve elements will be protected against the effects of cold thickened oil and especially during the return flow of such an oil from the implement.

From the preceding paragraphs it will be seen that my novel improved hydraulic coupling device is effective for interconnecting conduit sections even though one such section is subjected to high trapped fluid pressure. It will further be noted from the foregoing description that my novel coupling device is so arranged and constructed that the respective check valve elements are very effectively and precisely urged to their seated relation during the uncoupling operation in a manner to minimize damage and excessive wear to these eleemnts. Furthermore my improved coupling device is provided with an improved sealing means whereby a sealing effect is effectively maintained throughout the uncoupling operation without subjecting the compressible sealing element to excessive wear through extrusion.

It will therefore be seen that I have provided a novel coupling device, which is not only of simple and inexpensive construction, but one which functions in a more efficient manner than any heretofore known comparable devices.

It will of course be understood that various changes may be made in the form, details, arrangement and proportions of the various parts without departing from the scope of my invention.

What is claimed is:

1. Coupling mechanism for releasably connecting and intercommunicating a pair of pressure-fluid conduit sections, having in combination;
   a pair of cooperating body members one connected with a source of pressure fluid and the other connected with a device to be powered by fluid pressure,
   said body members having longitudinal bores and adapted to be moved substantially end-to-end, with relative inward longitudinal movement for coupling,
   means for releasably interlocking said body members in fully coupled position thereof,
   the bores of said body members having opposed annular valve seats disposed in close coaxial spaced relation when said body members are fully coupled,
   check valves in said bores each having a forward peripheral portion protrusible through its related valve seat, the relation of said protrusions with the spaced relation of said valve seats being such that abutment of said protruding valve portions occurs just prior to final inward longitudinal movement of said body members in coupling, the valve in the pressure source body being retractable away from its associated seat a sufficient distance upon engagement of the protruding valve portion of the device-connected body when the valve of the device-connected body is maintained on its associated seat by the pressure within the device to allow the completion of the coupling and locking thereof,
   imperforate, hollow guide and shield members in said bores each having a closed rear end and an open front end positioned in close proximity to its associated valve seat and receiving and guiding the associated check valve therein, and shielding the associated check valve against fluid pressure,
   stop means limiting the retraction of the valve of the device-connecting body to a position where both valves in abutment are equally spaced from their respective seats,
   resilient means positioned within said tubular members urging said valve elements against their respective seats, the means for the valve of said source connected body being substantially excessive in strength to the means for the other of said valve elements, each check valve when disposed in seated relation upon the associated valve seat being retained against said valve seat regardless of the fluid pressure exerted thereagainst by fluid within the associated body member,
   whereby the valve elements are shielded against the effects of fluid pressure during uncoupling and are returned to their respective seats by action of the resilient means.

2. Coupling mechanism for releasably connecting and intercommunicating a pair of pressure-fluid conduit sections, where one is subjected to trapped pressure conditions, having in combination;
   a pair of cooperating body members, one connected with a source of pressure fluid and the other connected with a device to be powered by fluid pressure,
   said body members having longitudinal bores and adapted to be moved substantially end-to-end, with relative inward longitudinal movement for coupling,
   means for releasably interlocking said body members in fully coupled position thereof,
   the bores of said body members having opposed annular valve seats disposed in close coaxial spaced relation when said body members are fully coupled,
   check valves in said bores each having a forward peripheral portion protrusible through its related valve seat, the relation of said protrusions with the spaced relation of said valve seats being such that abutment of said protruding valve portions occurs just prior to final inward longitudinal movement of said body members in coupling, the valve in the pressure source body being retractable away from its associated seat a sufficient distance upon engagement of the protruding valve portion of the device-connected body when the valve of the device-connected body is maintained on its associated seat by the pressure within the device to allow the completion of the coupling and locking thereof,
   a pair of imperforate hollow guide and shield members each being coaxially disposed in one of said body members and having a closed rear end and an open forward end positioned in close proximity to its associated valve seat, for receiving and guiding the associated check valve elements therein and shielding the same against fluid pressure,
   resilient means positioned in said shield members and urging said valve elements against their respective seats, the means for the valve of said source connected body being substantially excessive in strength to the means for said second valve, each check valve when disposed in seated relation upon the associated valve seat being retained against said valve seat regardless of the fluid pressure exerted thereagainst by fluid within the associated body member,
   a stop and plunger element positioned within the guide and shield member of the device-connected body and being axially movable therein, said stop and plunger element limiting the retraction of the associated valve elements to a position where both valves in abutment are equally spaced from their respective seats, and being axially shiftable in response to fluid pressure to assist the associated resilient means in returning its associated valve element to its seated position.

3. The structure as defined in claim 2 wherein said valve guide and shield member of the source-connected body member is arranged and constructed to permit retraction of its associated valve a distance corresponding at least to twice the distance of retraction of the other of the valves.

4. Coupling mechanism for releasably connecting and interconnecting a pair of pressure-fluid conduit sections having in combination;

male and female cooperating body members, said female body member being connected with a source of fluid under pressure and said male body member being connected with a device to be powered by fluid pressure, said body members having longitudinal bores and telescopically interfitting terminal portions adapted to be brought into substantially abutted coupled position with preceding relative inward longitudinal movement thereof, said bores having opposed annular valve seats disposed in close coaxial spaced relation when said body members are coupled, check valve elements in said bores, each having a forward peripheral portion protrusible through its related valve seat, the relation of said protrusions within the spaced relation of said valve seats being such that abutment of said protruding valve portions occurs just prior to final inward telescopic movement of said body members in coupling, the valve in the pressure source body being retractable away from its associated seat a sufficient distance upon engagement of the protruding valve portion of the device-connected body when the valve of the device-connected body is maintained on its associated seat by the pressure within the device to allow the completion of the coupling and locking thereof, a pair of elongate imperforate hollow guide and shield sleeves each being positioned in the bore of one of said body members and each having a closed rear end and open front end, the latter being positioned in close proximity to its associated valve seat for receiving and guiding the associated check valve element therein and shielding the same against the fluid pressure, resilient means positioned in each of said sleeves for urging each of the valve elements against its respective seats, the means for the valve element of said female body member having a compression strength substantially greater than that of the means for the other valve element, each check valve elements when disposed in seated relation upon the assocaited valve seat being retained against said valve seat regardless of the fluid pressure exerted thereagainst by fluid within the associated body member, a combination stop and valve shifting means positioned within one of said sleeves for axial movement therein and being engageable by its associated valve element to limit retraction thereof from its seat to a position where both valves in abutment are equally spaced from their respective seats, said stop and valve shifting means being axially shiftable in response to fluid pressure to assist its associated spring in urging its associated valve element onto its associated seat.

5. The structure as defined in claim 4 wherein said combination stop and valve shifting means is mounted within the sleeve of said device connected body.

6. Coupling mechanism for releasably connecting and intercommunicating a pair of pressure-fluid conduit sections, having in combination;

a pair of cooperating body members one connected with a source of pressure fluid and the other connected with a device to be powered by fluid pressure, said body members having longitudinal bores and adapted to be moved substantially end-to-end, with relative inward longitudinal movement for coupling, means for releasably interlocking said body members in fully coupled position thereof, the bores of said body members having opposed annular valve seats disposed in close coaxial spaced relation when said body members are fully coupled, check valves in said bores each having a forward peripheral portion protrusible through its related valve seat, the relation of said protrusions with the spaced relation of said valve seats being such that abutment of said protruding valve portions occurs just prior to final inward longitudinal movement of said body members in coupling, the valve in the pressure source body being retractable away from its associated seat a sufficient distance upon engagement of the protruding valve portion of the device-connected body when the valve of the device-connected body is maintained on its associated seat by the pressure within the device to allow the completion of the coupling and locking thereof, resilient means for urging said valve elements against their respective seats, the means for the valve of said source connected body being substantially excessive in strength to means for said second valve, each check valve when disposed in seated relation upon the associated valve seat being retained against said valve seat regardless of the fluid pressure exerted thereagainst by fluid within the associated body member, stop means limiting the retraction of the valve of the device-connected body to a position where both valves in abutment are equally spaced from their respective seats, and an imperforate hollow guide and shield member in the bore of said source-connected body member, said guide and shield member having a closed rear end and an open front end positioned in close proximity to its associated valve seat and receiving and guiding an associated check valve therein whereby to shield said last mentioned valve element against the effects of fluid pressure during uncoupling and thereby permit return of the last mentioned valve element to its valve seat by action of the associated resilient means.

7. Coupling mechanism for releasably connecting and intercommunicating a pair of pressure-fluid conduit sections, having in combination a pair of cooperating body members one connected with a source of pressure fluid and the other connected with a device to be powered by fluid pressure, said body members having longitudinal bores and adapted to be moved substantially end-to-end, with relative inward longitudinal movement for coupling, means for releasably interlocking said body members in fully coupled position thereof, the bores of said body members having opposed annular valve seats disposed in close coaxial spaced relation when said body members are fully coupled, ball check valves in said bores each having a forward peripheral portion protrusible through its related valve seat, the relation of said protrusions with the spaced relation of said valve seats being such that abutment of said protruding valve portions occurs just prior to final inward longitudinal movement of said body members in coupling, the valve in the pressure source body being retractable away from its associated seat a sufficient distance upon engagement of the protruding valve portion of the device-connected body when the valve of the device-connected body is maintained on its associated seat by the pressure within the device to allow the completion of the coupling and locking thereof, imperforate hollow guide and shield members in said bores, each having a closed end and an open front end positioned in close proximity to its associated valve seat and receiving and guiding the associated check valve therein, and shielding the associated check valve against fluid pressure, stop means limiting the retraction of at least one of said check valves to a position where both valves in abutment are equally spaced from their respective seats, resilient means positioned within said shield members urging said check valves against their respective seats, each check valve when disposed in seated relation upon the associated valve seat being retained against said valve seat regardless of the fluid pressure exerted thereagainst by fluid within the associated body member, whereby the check valves are shielded against the effects of fluid pressure during uncoupling and are returned to their respective seats by action of the resilient means.

8. Coupling mechanism for releasably connecting and intercommunicating a pair of pressure-fluid conduit sections, having in combination a pair of cooperating body members one connected with a source of pressure fluid and the other connected with a device to be powered by fluid pressure, said body members having longitudinal bores and adapted to be moved substantially end-to-end, with relative inward longitudinal movement for coupling, means for releasably interlocking said body members together in fully coupled position thereof, the bores of said body members having opposed annular valve seats disposed in close coaxial spaced relation when said body members are fully coupled, check valves in said bores each having a forward peripheral portion protrusible through its related valve seat, the relation of said protrusions with the spaced relation of said valve seats being such that abutment of said protruding valve portions occurs just prior to final inward longitudinal movement of said body members in coupling, the valve in the pressure source body being retractable away from its associated seat a sufficient distance upon engagement of the protruding valve portion of the device-connected body when the valve of the device-connected body is maintained on its associated seat by the pressure within the device to allow the completion of the coupling and locking thereof, stop means limiting the retraction of the valve of the device-connected body to a position where both valves in abutment are equally spaced from their respective seats, and an imperforate hollow guide and shield member fixedly positioned within the bore of one of said body members, said guide and shield member having a rear end and an open front end positioned in close proximity to its associated valve seat and receiving and guiding an associated check valve therein, and shielding the associated valve against fluid pressure, and resilient means within said shield urging said valve against its associated seat and held thereon regardless of the pressure exerted thereagainst.

References Cited by the Examiner
UNITED STATES PATENTS

| | | | |
|---|---|---|---|
| 123,546 | 2/72 | Ashton | 137—536 |
| 1,666,402 | 4/28 | Wood | 137—539 XR |
| 2,705,159 | 3/55 | Pfau | 137—614.03 XR |
| 2,706,646 | 4/55 | Olson | 137—614.04 |

FOREIGN PATENTS

| | | |
|---|---|---|
| 1,097,802 | 2/55 | France. |

ISADOR WEIL, *Primary Examiner.*

WILLIAM F. O'DEA, *Examiner.*